(12) United States Patent  (10) Patent No.: US 8,547,695 B2
Schroeder  (45) Date of Patent: Oct. 1, 2013

(54) APPARATUS FOR PROTECTING A SMART DEVICE

(75) Inventor: Steve Schroeder, Wilton, CA (US)

(73) Assignee: Steve Schroeder, Wilton, CA (US)

( * ) Notice: Subject to any disclaimer, the term of this patent is extended or adjusted under 35 U.S.C. 154(b) by 141 days.

(21) Appl. No.: 13/330,419

(22) Filed: Dec. 19, 2011

(65) Prior Publication Data

US 2013/0155610 A1  Jun. 20, 2013

(51) Int. Cl.
*G06F 1/16* (2006.01)

(52) U.S. Cl.
USPC ............ 361/679.57; 345/179; 312/265.5; 248/176.3

(58) Field of Classification Search
USPC ............ 439/153, 620.01, 329, 342, 626; 248/274.1, 183.1, 183.2, 158, 176.1, 176.3; 174/564, 520, 560, 535, 561, 539, 369, 377, 174/383; 312/223.1, 223.2, 9.43, 323, 236, 312/265.5, 216; 345/156, 163, 179; 361/679.01, 679.02, 679.55, 679.33, 679.06, 361/679.09, 679.58, 679.31, 679.48, 679.37, 361/679.47, 679.54, 679.4, 679.46, 679.21, 361/679.38

See application file for complete search history.

(56) References Cited

U.S. PATENT DOCUMENTS

| | | | |
|---|---|---|---|
| 2011/0005576 A1* | 1/2011 | Bullen et al. | 136/246 |
| 2012/0170204 A1* | 7/2012 | Ahn et al. | 361/679.41 |
| 2013/0155610 A1* | 6/2013 | Schroeder | 361/679.58 |

* cited by examiner

*Primary Examiner* — Hung Duong
(74) *Attorney, Agent, or Firm* — Perkins Coie LLP

(57) ABSTRACT

A removable pad kit for a smart device, such as an iPhone®, an iPad®, a Samsung Galaxy®, a Samsung Galaxy Tab®, or the like, is disclosed. The removable kit may comprise a removable pad. The removable pad is configured to at least partially cover a home button, or the like, of the smart device to protect the home button and prevent accidental or intentional tapping on the home button.

20 Claims, 9 Drawing Sheets

APPARATUS FOR PROTECTING A SMART DEVICE

TECHNICAL FIELD

At least one embodiment of the present disclosure pertains to portable electronic devices, and more particularly, to removable pads and protective cases disposed on the portable electronic devices.

BACKGROUND

In the past few years, the rate of smart device adoption is accelerating. According to Gartner in their report dated May 19, 2011, worldwide smart device sales to end users totaled over 100 million units in the first quarter of 2011, an increase of 85 percent year-to-year. The availability of digital application distribution platforms was a big contribution to this growth. Many end users purchase smart devices for the purpose of using business applications, educational applications, games, and other applications available on the smart devices. As of Jun. 6, 2011, there are at least 425,000 third-party applications officially available on the App Store®.

Many smart devices use a multi-touch interface, which has a touch screen for direct finger input as its main means for interaction instead of having a keyboard and/or a keypad. Common resolutions for smart device screens vary from 240× 320 to 768×1024, with many flagship smart devices at 768× 1024. As a result, the touch screen can be very sensitive to even accidental taps on the screen.

One problem with some flagship smart devices, such as iPhone®, iPad®, Samsung Galaxy®, Samsung Galaxy Tab® etc., is that there is a physical home button near its touch screen or a home button on its touch screen. An accidental tap on the home button can terminate business applications, educational applications, games or applications that an end user is using. For example, a child using an educational application on a smart device may accidentally tap a home button, or tap the home button against the intentions of the parents. When that happens, the smart device's display automatically switches to a home screen, and the child may have difficulties in finding and going back to the educational application, contrary to the educational intention of the parents. As another example, multiple devices may be distributed to a group of students by a single educator with the intent of using a specific educational application. Many of the students may intentionally press the home button against the wishes of the educator. As a further example, devices may be distributed to a group of employees for a single specific business purpose, and the employees may use the home button to use the device for non-work related purposes.

SUMMARY

The present inventor has recognized that there is a need in preventing accidental tapping on the home button, and there is an additional need to lock or prevent access to the home button. Accordingly, the present disclosure provides a means for a smart-device, such as iPhone®, iPad®, Samsung Galaxy®, Samsung Galaxy Tab®, or the like, to prevent accidental tapping on the home button. The present disclosure also provides a means for the same list of smart devices to have the home button locked from casual access.

According to a broad aspect of a preferred embodiment of the present disclosure, a removable pad kit is provided. The removable pad kit may comprise a removable pad. The removable pad is configured to at least partially cover a home button, or the like, of a smart device and protect the home button from accidental tapping. In some instances, a smart device is provided with a sliding or other locking mechanism that allows a user to cover and/or lock the home button(s) of the smart device to prevent a user from accessing the home button. Such a locking mechanism may be configured as part of a protective case of such a smart device or may be specifically built targeting the area of the home button. In some instances, such as in the first example illustrated in the background, a protective case or a special fitting may include a locking/unlocking feature, a feature to connect that locking/unlocking feature to the smart device, and/or a toggle feature to allow a user to switch the locking/unlocking mechanism to switch or toggle from a locked position to an unlocked position. In some instances, an optional slide lock feature allows a user to prevent access to the toggle or the locking/unlocking feature by providing a padlock or other such mechanism to "lock" the toggle feature. Such an optional slide lock feature may be used when some users (e.g., institutions or corporations) wish to distribute the smart device to a user for educational or business purposes but do not want the user to have any access to the home button—accidentally or intentionally. In some instances, instead of a padlock-type mechanism, the toggle lock or the slide lock feature may simply be any type of child-proof mechanism (example, a lock that would require a stylus pen clip to open) that a child would not be able to easily overcome. It is understood that other similar features and additions, as may be envisioned by a person of ordinary skill in the art, may also be substituted with the various features discussed above with the focus of achieving the purpose of this invention, namely in providing an external and removable feature that allows a person to lock or otherwise preclude access to one or more home buttons of a smart device.

Other advantages and features will become apparent from the following description and claims. It should be understood that the description and specific examples are intended for purposes of illustration only and not intended to limit the scope of the present disclosure.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present disclosure. Occurrences of such phrases in this specification do not necessarily all refer to the same embodiment.

Figure 1:
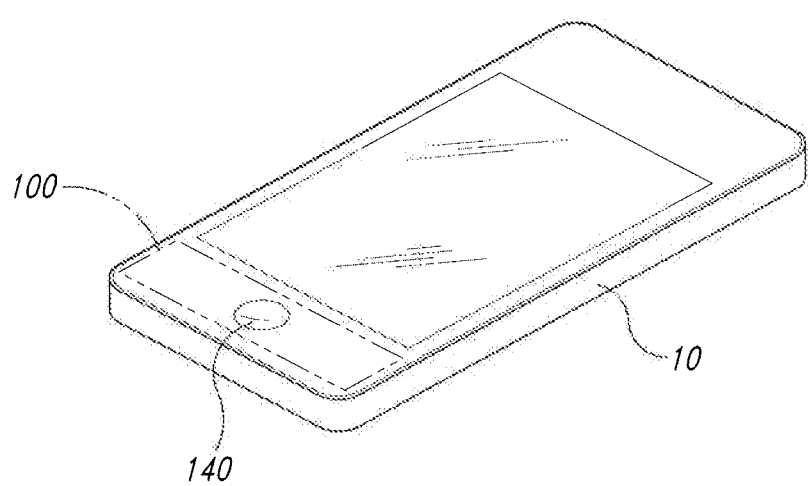
FIG. 1 is an isometric view illustrating a removable pad disposed onto an iPhone® or an iPad® in accordance with an embodiment of the present disclosure.

As indicated in FIG. 1, an embodiment of the present disclosure includes a removable pad kit 100 for an iPhone® or an iPad® 10, or the like. For example, when it comes to playing games or other applications on the smart device 10, users may put the removable pad kit 100 onto the smart device 10 easily, which then at least partially covers a home button 140, or the like, of the smart device 10. Users may then enjoy playing games or other applications without worrying about being disturbed by accidentally tapping on the home button 140, or the like. In some implementations, as illustrated in FIG. 1, the home button is physically separated from a display portion of the smart device 10. In some implementations, the home button is located within a display portion of the smart device 10. In some embodiments, the pad kit 100 is held in position on the smart device 10 using, for example, an adhesive or other such attaching means as may be known to a person of ordinary skill in the art.

The material of the removable pad kit 100 may include, but is not limited to, rubber, silicone rubber, resins, plastic resins, polymer, synthetic materials, or the like. In addition, the material of the removable pad kit 100 may have elastic properties and/or be flexible to enable a snug fit with the smart device 10 and match the aesthetic appearance of the smart device 10.

Figure 2A:
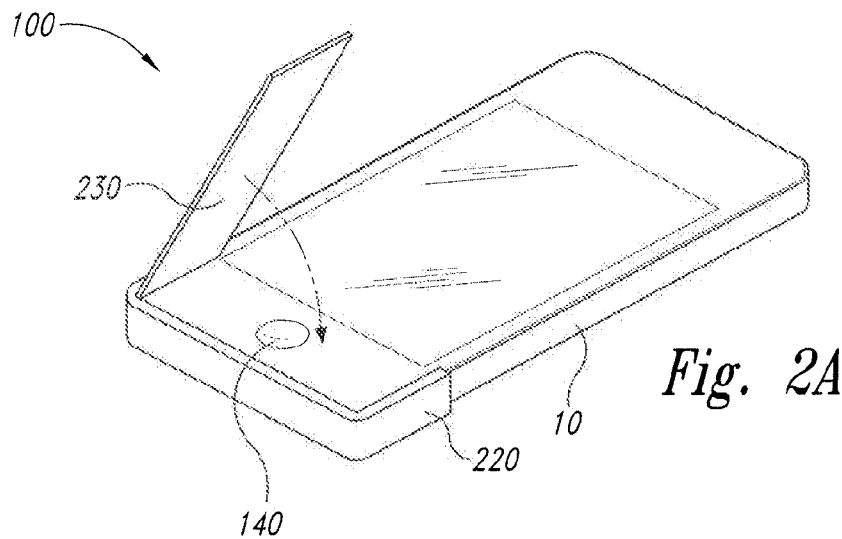
FIG. 2A is an isometric view illustrating a flip-up lid disposed onto an iPhone® or an iPad® in accordance with another embodiment of the present disclosure.

In some implementations, as illustrated in FIG. 2A, the removable pad kit 100 may include a carrying case 220 that fits onto at least a portion of the smart device 10. The carrying case 220 fits the smart device 10. The removable pad kit 100 may comprise a flip-up lid 230. The flip-up lid 230 may have one end as a pivot that is, for example, mechanically connected to the carrying case 220 with the other end capable of flipping up and down relative to the smart device 10. Users may choose to put the flip-up lid 230 down onto the smart device 10, which then at least partially covers the home button 140, or the like, of the smart device. In some implementations, the flip-up lid 230 may be easily detachable from the carrying case 220. In some implementations, the flip-up lid 230 may be, for example, a Velcro strap. In some implementations, the flip-up lid 230 may be connected to the carrying case 220 by a living hinge or the like. When the flip-up lid 230 is flipped up away from the smart device 10, it may serve as a leg or a stand to support the smart device in an upright vertical or vertical orientation.

Figure 2B:
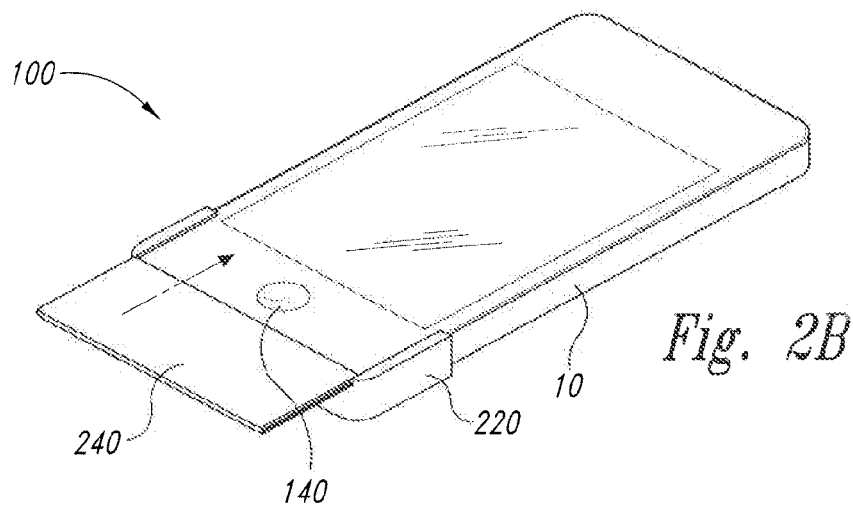
FIG. 2B is an isometric view illustrating a sliding lid disposed onto an iPhone® or an iPad® in accordance with yet another embodiment of the present disclosure.
Figure 2C:
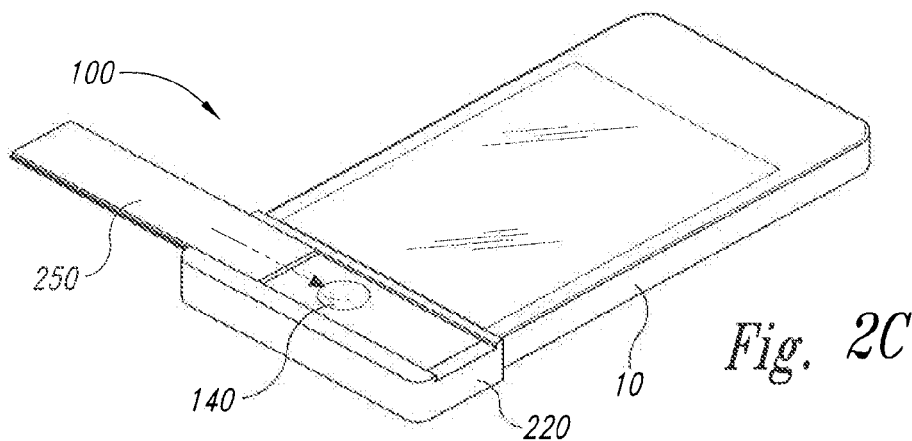
FIG. 2C is an isometric view illustrating of a sliding lid disposed onto an iPhone® or an iPad® in accordance with yet another embodiment of the present disclosure.
Figure 2D:
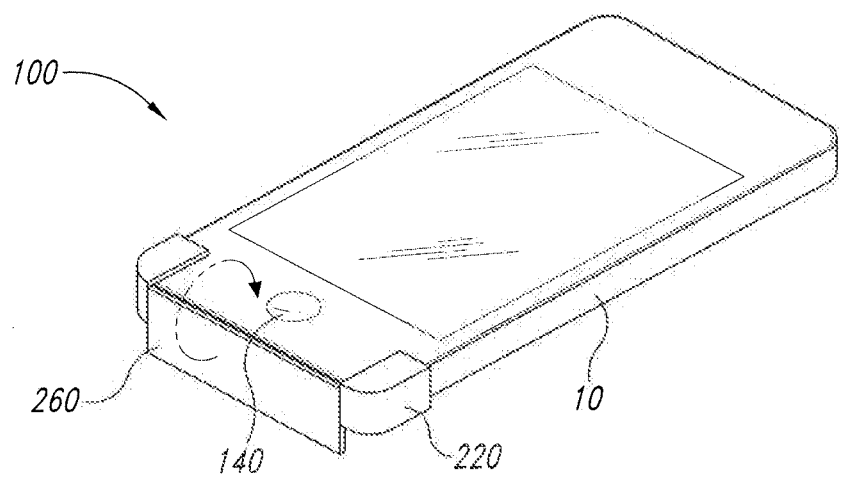
FIG. 2D is an isometric view illustrating a rolling lid disposed onto an iPhone® or an iPad® in accordance with yet another embodiment of the present disclosure.

In some implementations, as illustrated in FIG. 2B, the removable pad kit 100 may include a carrying case 220 for the smart device 10. The removable pad kit 100 may comprise a sliding lid 240. Users may choose to slide the sliding lid 240 onto the smart device 10 to at least partially cover the home button 140, or the like, of the smart device 10. In some implementations, as illustrated in FIG. 2C, the removable pad kit 100 may comprise a slide lid 250. The slide lid 250 may be slid from side to side onto the smart device 10 to at least partially cover the home button 140, or the like, of the smart device 10. In some implementations, as illustrated in FIG. 2D, the removable pad 100 may comprise a rolling lid 260. Users may choose to roll the rolling lid 260 onto the smart device 10 to at least partially cover the home button 140, or the like, of the smart device 10.

Figure 3:
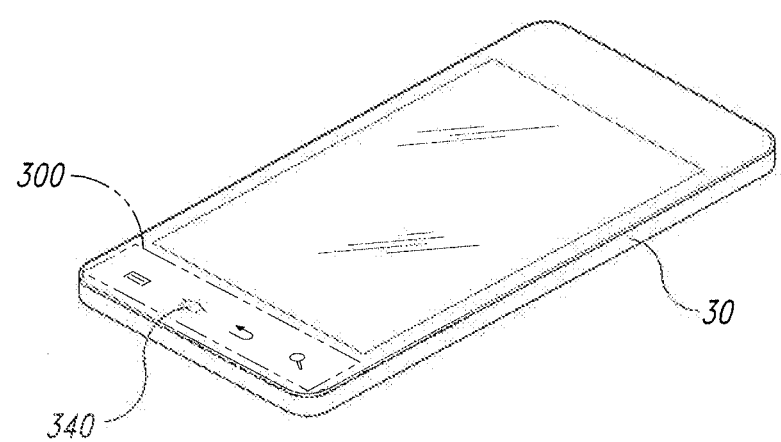
FIG. 3 is an isometric view illustrating a removable pad disposed onto a Samsung Galaxy® or a Samsung Galaxy Tab® in accordance with yet another embodiment of the present disclosure.

As illustrated in FIG. 3, another embodiment of the present disclosure includes a removable pad kit 300 for a Samsung Galaxy®, a Samsung Galaxy Tab® 30, or the like. For example, when an end user is playing games or using other applications on the smart device 30, the user may put the removable pad 300 onto the smart device 30, which then at least partially covers a home button 340, or the like, of the smart device 30. The removable pad kit 300 protects the home button 340 from accidental taps. In other implementations, as illustrated in FIG. 3, the home button is physically separated from a display portion of the smart device 30. In some implementations, the home button is located within a display portion of the smart device 30. Again, the pad kit 300 may be secured to (or otherwise placed in position on) the smart device 30 using for example, some form of adhesive that allows easily placement and removal.

The material of the removable pad kit 300 may include, but is not limited to, rubber, silicone rubber, resins, plastic resins, polymer, synthetic materials, or the like. In addition, the material of the removable pad kit 300 may have elastic properties and/or be flexible to enable close contact with the smart device 30 and match the aesthetic appearance of the smart device 30.

Figure 4A:
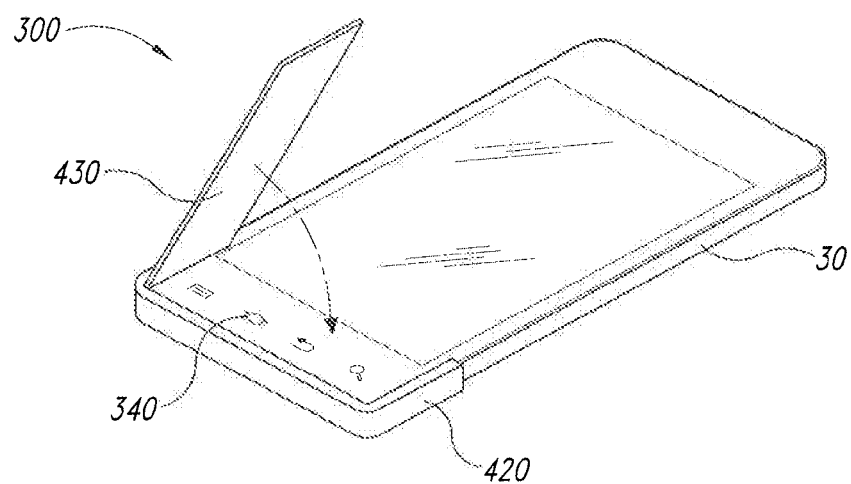
FIG. 4A is an isometric view illustrating a flip-up lid disposed onto a Samsung Galaxy® or a Samsung Galaxy Tab® in accordance with yet another embodiment of the present disclosure.

In some implementations, as illustrated in FIG. 4A, the removable pad kit 300 may include a carrying case 420 that fits the smart device 30. The carrying case 420 fits the smart device 30. The removable pad kit 300 may comprise a flip-up lid 430. The flip-up lid 430 may have one end as a pivot that is, for example, mechanically connected to the carrying case 420, with the other end capable of flipping up and down relative to the smart device 30. Users may choose to put the flip-up lid 430 down onto the smart device 30, which then at least partially covers the home button 340 of the smart device 30, to protect the home button from accidental tapping. In some implementations, the flip-up lid 430 may include easily detachable from the carrying case 420. In some implementations, the flip-up lid 430 may be, for example, a Velcro® strap. In some implementations, the flip-up lid 430 can be connected to the carrying case 420 by a living hinge or the like. When the flip-up lid 430 is flipped up away from the smart device 30, it may serve as a leg or stand to support the smart device 30 in an upright position.

Figure 4B:
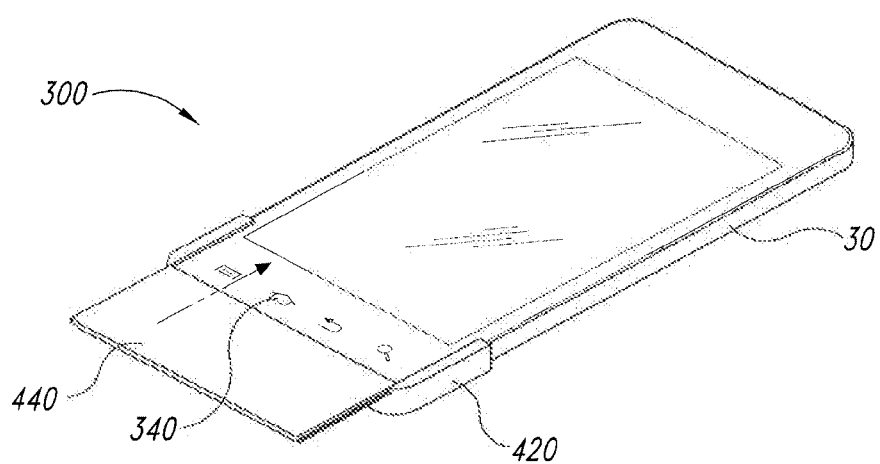
FIG. 4B is an isometric view illustrating a sliding lid disposed onto a Samsung Galaxy® or a Samsung Galaxy Tab® in accordance with yet another embodiment of the present disclosure.
Figure 4C:
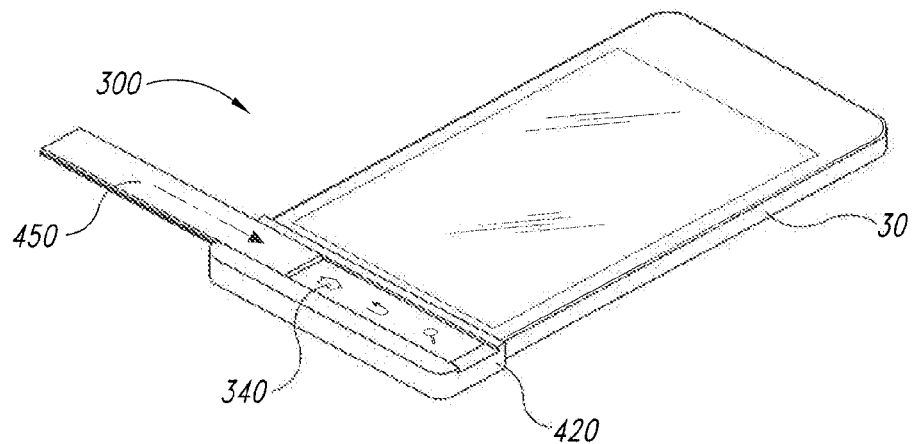
FIG. 4C is an isometric view illustrating a sliding lid disposed onto a Samsung Galaxy® or a Samsung Galaxy Tab® in accordance with yet another embodiment of the present disclosure.
Figure 4D:
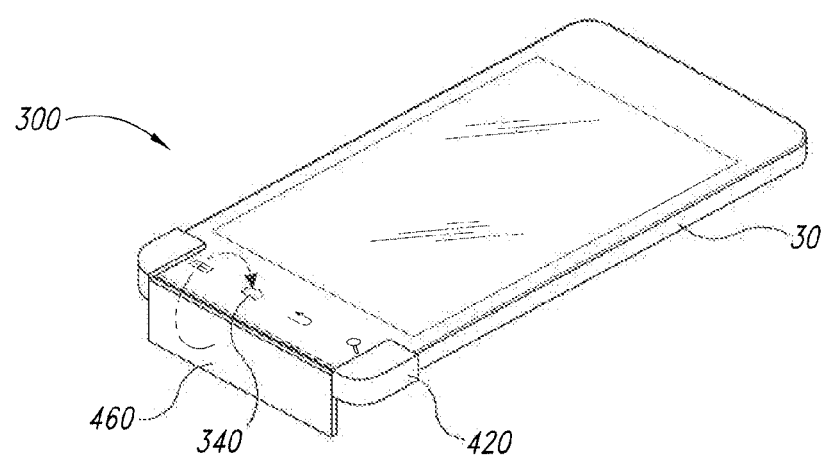
FIG. 4D is an isometric view illustrating a rolling lid disposed onto a Samsung Galaxy® or a Samsung Galaxy Tab® in accordance with yet another embodiment of the present disclosure.

In some implementations, as illustrated in FIG. 4B, the carrying case 120 may include a carrying case 420 for the smart device 30. The removable pad kit 300 may comprise a sliding lid 440. Users may choose to slide the sliding lid 440 onto the smart device 30 to at least partially cover the home button 340, or the like, of the smart device 30, to protect the home button from an accidental tap. In some implementations, as illustrated in FIG. 4C, the removable pad kit 100 may comprise a slide lid 450. The slide lid 450 may be slid from side to side onto the smart device 30 to at least partially cover a home button 340, or the like, of the smart device 30. In some implementations, as illustrated in FIG. 4D, the removable pad 300 may comprise a rolling lid 460. Users may choose to roll the rolling lid 460 onto the smart device 30 to at least partially cover a home button 340, or the like, of the smart device 30, to protect the home button 340 from an accidental tap.

Figure 5:
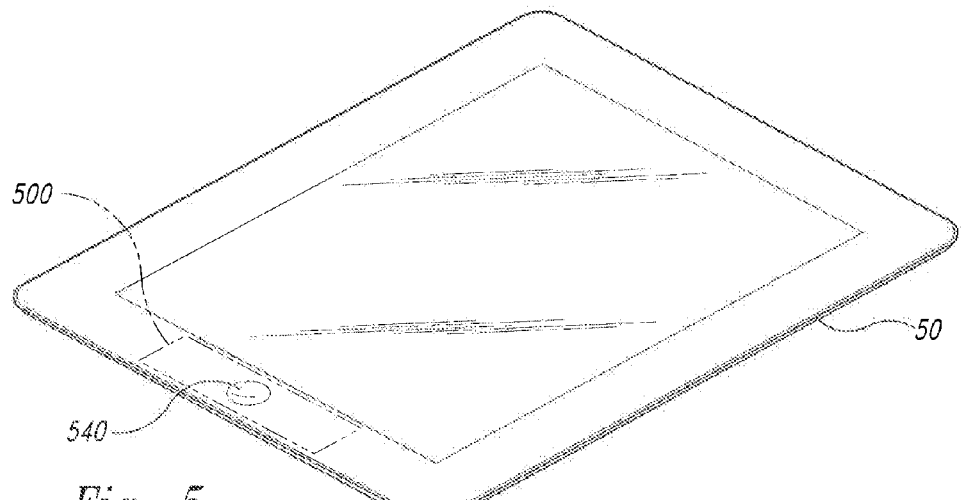
FIG. 5 is an isometric view illustrating a removable pad disposed onto an iPad® in accordance with yet another embodiment of the present disclosure.

FIG. 5 illustrates yet another embodiment of the present disclosure. In this embodiment, a removable pad kit 500 is provided for an iPad® 50. For example, when playing games or other applications on the iPad® 50, users may choose to put the removable pad 500 onto the iPad® 50 to cover a home button 540. The material of the removable pad 500 may include, but is not limited to, rubber, silicone rubber, resins, plastic resins, polymer, synthetic materials, or the like. In addition, the material of the removable pad 500 may have elastic properties and/or be flexible to enable a snug fit with the iPad® 50 and match the aesthetic appearance of the iPad® 50.

Figure 6A:
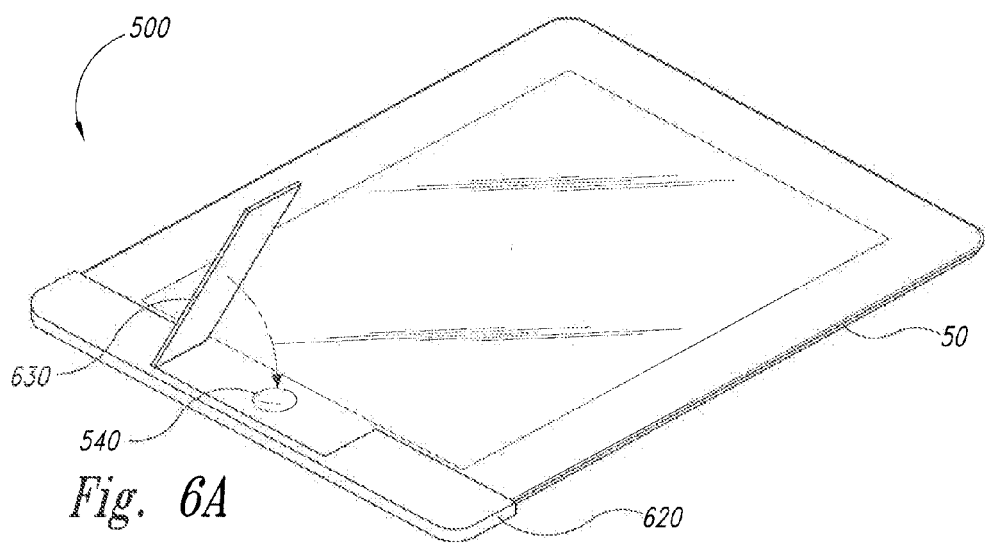
FIG. 6A is an isometric view illustrating a flip-up lid disposed onto an iPad® in accordance with yet another embodiment of the present disclosure.

In some implementations, as illustrated in FIG. 6A, the carrying case 620 may include a carrying case 620 for the iPad® 50. The removable pad 500 may comprise a flip-up lid 630. The flip-up lid 630 may have one end as a pivot that is, for example, mechanically connected to the carrying case 620 with the other end configured to flip up and down relative the iPad® 50. Users may choose to put the flip-up lid 630 down onto the touch screen 510, which then at least partially covers the home button 540 of the iPad® 50. In some implementations, the flip-up lid 630 may include easily detachable from the carrying case 620. In some implementations, the flip-up lid 630 may be, for example, a Velcro strap. In some implementations, the flip-up lid 630 may be connected to the carrying case 620 by a living hinge or the like. When the flip-up lid 630 is flipped up away from the iPad® 50, it may serve as a leg to support the iPad® 50 in an upright position.

Figure 6B:
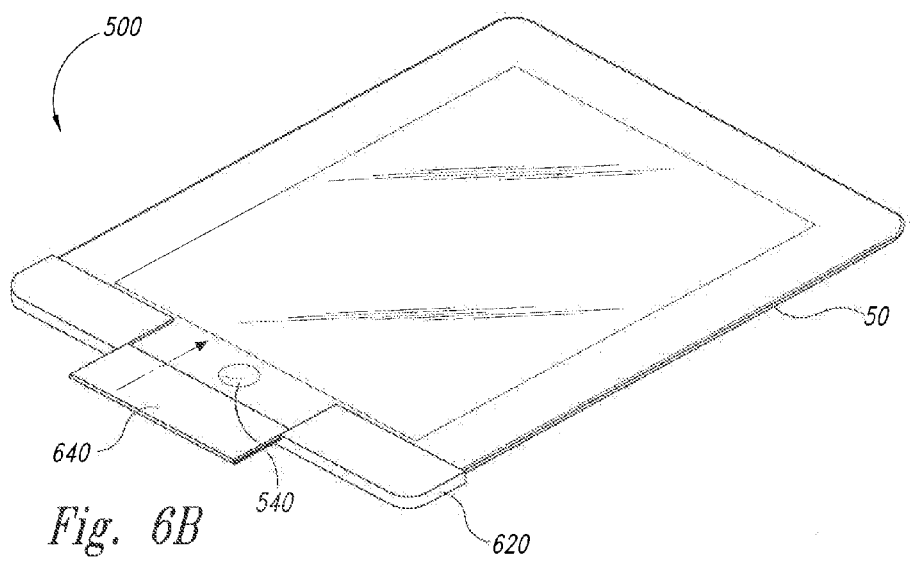
FIG. 6B is an isometric view illustrating a sliding lid disposed onto an iPad® in accordance with yet another embodiment of the present disclosure.
Figure 6C:
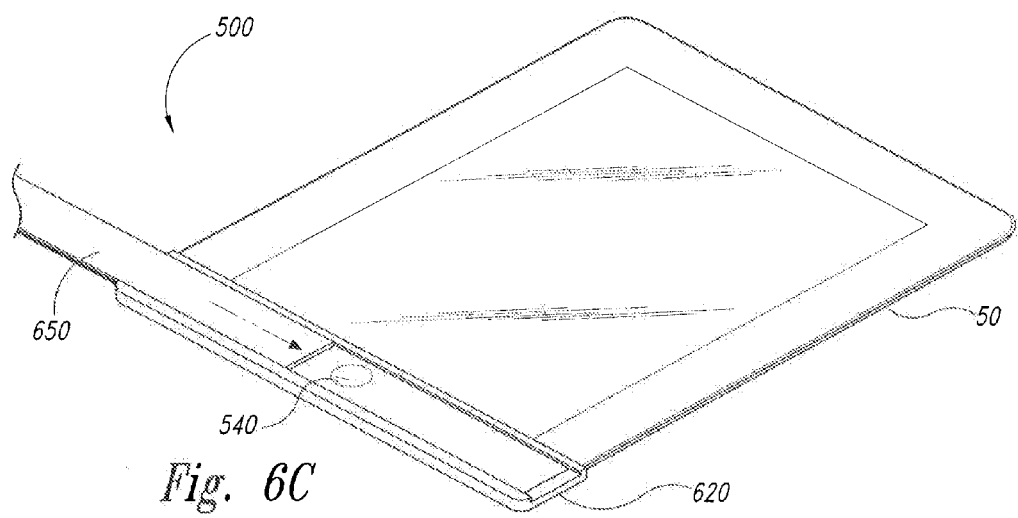
FIG. 6C is an isometric view illustrating a sliding lid disposed onto an iPad® in accordance with yet another embodiment of the present disclosure.
Figure 6D:
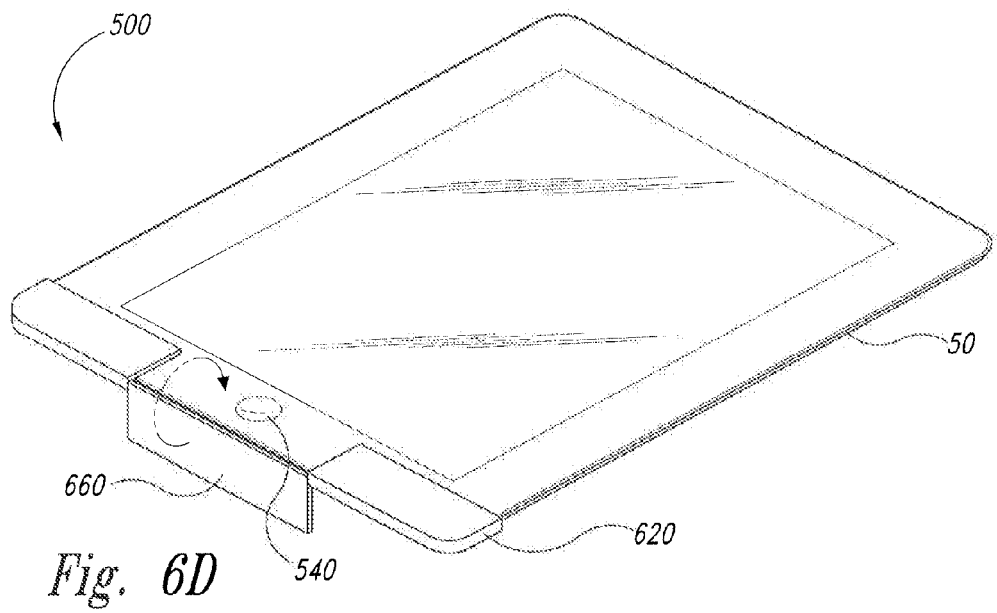
FIG. 6D is an isometric view illustrating a rolling lid disposed onto an iPad® in accordance with yet another embodiment of the present disclosure.

In some implementations, as illustrated in FIG. 6B, the removable pad 500 may include a carrying case 620 for the iPad® 50. The carrying case 620 may comprise a sliding lid 640. Users may choose to slide the sliding lid 640 onto the iPad® 50 to at least partially cover the home button 540 of the iPad® 50. In some implementations, as illustrated in FIG. 6C, the removable pad kit 500 may comprise a slide lid 650. The slide lid 650 may be slid from side to side onto the iPad® 50 to cover the home button 540 of the iPad® 50. In some implementations, as illustrated in FIG. 6D, the removable pad kit 500 may comprise a rolling lid 660. Users may choose to roll the rolling lid 660 onto the iPad® 50 to at least partially cover the home button 540 of the iPad® 50.

Figure 7A:
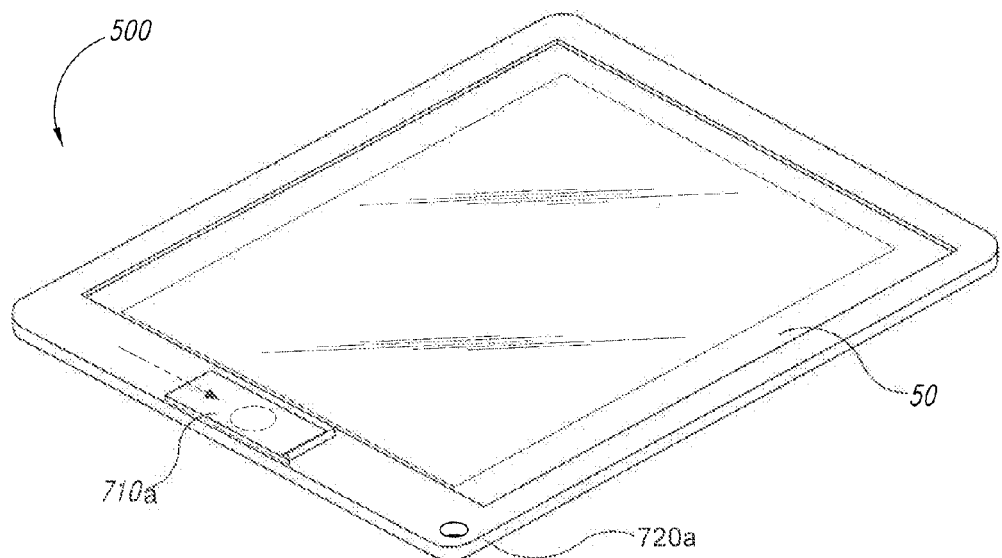
FIG. 7A is an isometric view illustrating a protective case having a sliding home button cover and a casual locking mechanism on an iPhone® or an iPad® in accordance with an embodiment of the present disclosure.
Figure 7B:
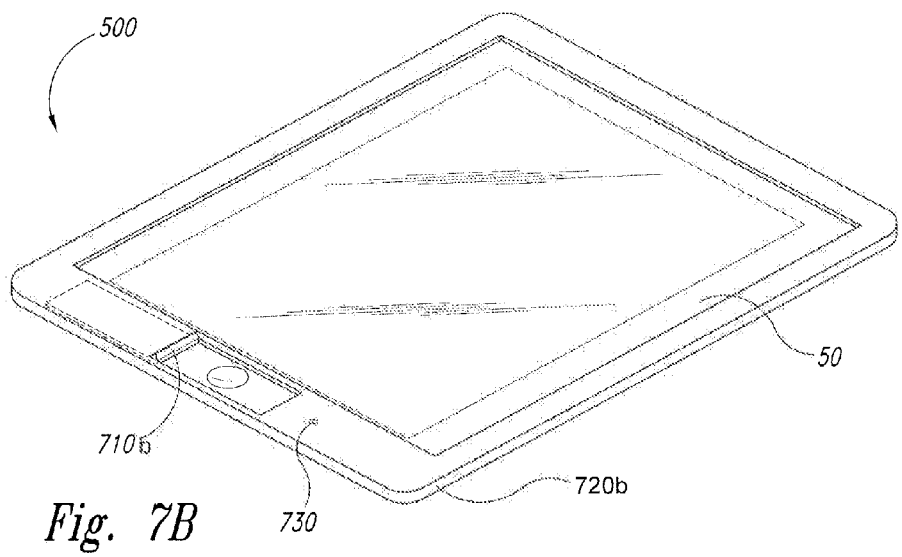
FIGS. 7B and 7C is an isometric view illustrating a protective case having a sliding home button cover and lock-and-key locking mechanism on an iPhone® or an iPad® in accordance with an embodiment of the present disclosure.

In some implementations, as illustrated in FIG. 7A, a smart device 50 may simply be fitted with a device protective case 720b that inherently includes a home button cover (e.g., a sliding cover 710a as illustrated in FIG. 7A) that provides a casual locking mechanism on an iPhone® or an iPad® without the need for any additional parts beyond the protective case that is fitted with the home button cover 710a. That is, a protective case 720b that is normally available to provide protection to at least one of base, front, and side surfaces of the smart device 50 may be fitted with an additional protection mechanism as illustrated in FIGS. 7A and 7B. In embodiments, and as illustrated in FIGS. 7A and 7B, such a protective case may include a base feature (for protecting the base surface), a front feature (for protecting the front surface), and a side feature (for protecting the side surfaces). In some embodiments, the protective case 720b may include a locking mechanism (e.g., 710a) as illustrated, for example, in FIGS. 7A and 7B. Because the locking mechanism is fitted in addition to (or atop of) a normally used protective case 720b, the locking mechanism and/or the home button cover 710a is "inherently" included in the protective case 720b.

Figure 7C:
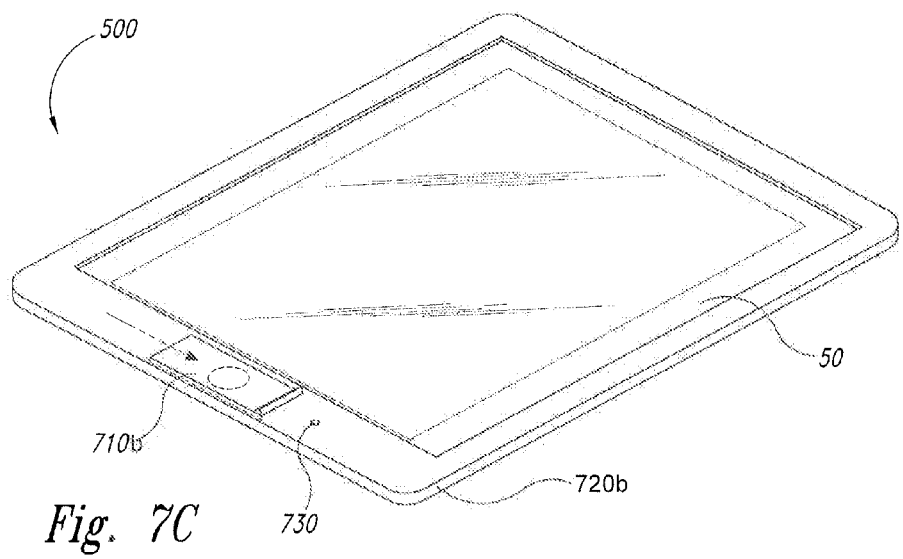

FIGS. 7B and 7C also illustrate schematic diagrams of a device protective case 720b with a sliding home button cover 710b. Here, as illustrated in this exemplary embodiment, the cover 710b may be fitted such that it slides laterally with respect to the home button. The lateral sliding motion may be achieved using, for example, a lock-and-key locking mechanism on an iPhone® or an iPad® as illustrated in FIGS. 7B and 7C. In a first example (as illustrated in FIGS. 7B and 7C), the lock-unlock mechanism would require the pressing of, for example, a stylus pen clip (or something similar) in a corresponding slot (e.g., lock release 730). In a second example, a more secure version of the locking mechanism may be implemented. Such a setup may be useful in, for example, an academic institution, where the institution may wish to prevent unlock access to the users. In such a case, it may be envisioned that such a sliding lock mechanism may be fitted with a feature that allows the slide lock to be padlocked. Any other mechanism for padlocking or otherwise preventing unlock access to a user, as may be envisioned by a person of ordinary skill in the art, may also be substituted herein.

It should be appreciated that the descriptions above are not limited in their applications to an iPhone®, an iPad®, a Samsung Galaxy®, or a Samsung Galaxy Tab®. The descriptions are capable of adaptation to any smart devices having the home button, or the like. According to the present disclosure, users may choose to cover the home button, or the like, and enjoy playing games or using other applications on the smart devices without being disturbed by accidentally tapping the home button, or the like. As a result, users may better enjoy the games and applications on the smart devices.

The foregoing description has been described with reference to specific embodiments for the purpose of explanations. However, the illustrative discussions above are not intended to be exhaustive or to limit the invention to the embodiments described. A person skilled in the art may appreciate that many modifications and variations are possible in view of the present disclosure.

What is claimed is:

1. A child-lock kit to control a user's access of a smart device, the kit comprising:
an attachment mechanism for attaching the child-lock kit to the smart device, the smart device having a touch-screen display portion and a non-display portion, wherein the non-display portion includes one or more buttons that control operation of the smart device, wherein a user's tapping on at least one of the one or more buttons of the smart devices affects content displayed within the display portion of the smart device;

a removable pad connected to the attachment mechanism, the removable pad having a first setting and a second setting, the first setting enabling operation of the one or more buttons by providing physical access to the user to tap on the one or more buttons, the second setting preventing operation of the smart device via the one or more buttons by preventing physical access to the user to tap on the one or more buttons; and a toggle mechanism for switching the removable pad between the first setting and the second setting, the toggle mechanism configured such that the second setting is a child-safe state tending to prevent toggling from the second setting to the first setting.

2. The child-lock kit of claim 1, wherein the attachment mechanism, the removable pad, and the toggle-mechanism are part of a carrying case for the smart device.

3. The child-lock kit of claim 2, wherein the carrying case further includes a connection element, the connection element configured such that the user can selectively attach the removable pad to the connection mechanism, enabling the user to selectively convert the carrying case to the child-lock kit by attachment of the removable pad.

4. The child-lock kit of claim 3, wherein the removable pad is a sliding lid that is configured to slide relative to the attachment mechanism, the sliding lid configured to at least partially cover the one or more buttons to prevent tapping on a home button when the sliding lid is slid onto the smart device.

5. The child-lock kit of claim 3, wherein the removable pad is a rolling lid that is configured to roll relative to the attachment mechanism, the rolling lid configured to at least partially cover the one or more buttons to prevent tapping on a home button when the rolling lid is rolled onto the smart device.

6. The child-lock kit of claim 1, wherein the removable pad is connected to the attachment mechanism such that the removable pad is a flip-up lid hinged to the attachment mechanism, the flip-up lid configured to at least partially cover the one or more buttons to prevent tapping on a home button when the flip-up lid is flipped down onto the smart device.

7. The child-lock kit of claim 6, wherein a first end portion of the flip-up lid is a pivot mechanically connected to the attachment mechanism and a second end is configured to toggle between a flip-up state and a flip-down state, the flip-up state allowing physical access to the one or more buttons and the flip-down state preventing physical access to the one or more buttons in the non-display portion of the smart device.

8. The child-lock of claim 7, wherein the flip-up lid, upon operation in a flip-up state, is configured to support the smart device in a substantially upright position.

9. The child-lock kit of claim 1, wherein the smart device is one of a smart phone or a tablet computing device.

10. A method for child-locking a smart device to control a user's access of the smart device, the method comprising:

fitting a removable pad to a carrying case of a smart device, the carrying case for covering at least a portion of the smart device and to prevent damage to the smart device, the smart device having a touch-screen display portion and a non-display portion, wherein the non-display portion includes one or more buttons that control operation of the smart device, wherein a user's tapping on at least one of the one or more buttons of the smart devices affects content displayed within the display portion of the smart device; and attaching the removable pad to the carrying case in conjunction with a toggle mechanism, the toggle mechanism for switching the removable pad between a first setting and a second setting relative to the smart device, wherein:

the first setting enables operation of the one or more buttons by providing physical access to the user to tap on the one or more buttons, the second setting prevents operation of the smart device via the one or more buttons by preventing physical access to the user to tap on the one or more buttons, and the toggle mechanism is configured such that the second setting is a child-safe state tending to prevent toggling from the second setting to the first setting.

11. The method of claim 10, wherein the removable pad is one of a flip-up lid, or a sliding lid, or a rolling lid.

12. The method of claim 10, wherein the smart device is one of a smart phone or a tablet computing device.

13. The method of claim 10, further comprising:

providing a connection mechanism to the carrying case to enable the user to selectively attach the removing pad to the carrying case to convert the carrying case to a child-lock kit.

14. A carrying case for a smart device, the carrying case comprising:

a base feature for protecting a rear surface of the smart device;

a front feature coupled to the base feature and configured to cover at least a portion of a front surface of the smart device, the smart device having a touch-screen display portion and a non-display portion, wherein the non-display portion includes one or more buttons that control operation of the smart device, wherein a user's tapping on at least one of the one or more buttons of the smart devices affects content displayed within the display portion of the smart device;

a removable pad optionally connected to the carrying case by attachment using the connection element; and a connection element configured such that a given user can selectively attach the removable pad to the connection mechanism, enabling the user to selectively convert the carrying case to a child-lock kit by attachment of the removable pad, the removable pad having a first setting and a second setting, the first setting enabling operation of the one or more buttons by providing access to the user to tap on the one or more buttons, the second setting preventing operation of the smart device via the one or more buttons by preventing physical access to the user to tap on the one or more buttons.

15. The carrying case of claim 14, further comprising:

a toggle mechanism for switching the removable pad between the first setting and the second setting, the toggle mechanism configured such that the second setting is a child-safe state tending to prevent toggling from the second setting to the first setting.

16. The carrying case of claim 15, wherein a first end portion of the flip-up lid is a pivot mechanically connected to the carrying case and a second end is configured to toggle between a flip-up state and a flip-down state, the flip-up state allowing physical access to the one or more buttons and the flip-down state preventing physical access to the one or more buttons in the non-display portion of the smart device.

17. The carrying case of claim 16, wherein the flip-up lid, upon operation in a flip-up state, is configured to support the smart device in a substantially upright position.

18. The carrying case of claim 14, wherein the removable pad is connected to the carrying case such that the removable pad is a flip-up lid, the flip-up lid configured to at least partially cover the one or more buttons to prevent tapping on the home button when the flip-up lid is flipped down onto the smart device.

19. The carrying case of claim 14, wherein the removable pad is a sliding lid that is configured to slide relative to the carrying case, the sliding lid configured to at least partially cover the one or more buttons to prevent tapping on a home button when the sliding lid is slid onto the smart device.

20. The carrying case of claim 14, wherein the removable pad is a rolling lid that is configured to roll relative to the carrying case, the rolling lid configured to at least partially cover the one or more buttons to prevent tapping on a home button when the rolling lid is rolled onto the smart device.

* * * * *